Patented Oct. 2, 1934

1,975,402

UNITED STATES PATENT OFFICE 1,975,402

AZODYESTUFFS

Wilhelm Neelmeier, Leverkusen-I. G. - Werk, Alfred Carl, Cologne-Rhine, and Hans Hertlein, Leverkusen-Wiesdorf, Germany, assignors to General Aniline Works, Inc., New York, N. Y., a corporation of Delaware No Drawing. Application June 3, 1933, Serial No. 674,258. In Germany June 10, 1932

6 Claims. (Cl. 260—95)

The present invention relates to azodyestuffs, more particularly it relates to dyestuffs which may be represented by the probable general formula:

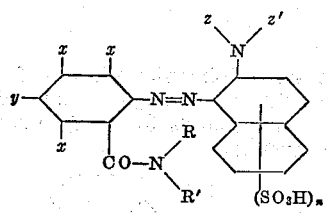

wherein $x$ stands for hydrogen which may be substituted by alkyl, alkoxy, acylamino, nitro or halogen, such as methyl, ethyl, propyl, isopropyl, butyl, methoxy, ethoxy, acetylamino, benzoylamino, and $y$ stands for hydrogen which may be substituted by alkyl, alkoxy, acylamino or halogen, R and R' stand for alkyl, aryl, hydroaryl, or aralkyl, such as methyl, ethyl, propyl, butyl, isobutyl, phenyl, which may contain substituents, for example, halogen or alkyl groups, or by a benzyl radical which may contain substituents in the benzene nucleus, for example, alkyl or halogen, or R and R' jointly stand for a pentamethylene chain, $z$ and $z'$ stand for hydrogen, alkyl or aryl, such as methyl, ethyl, phenyl and substituted phenyl, $n$ stands for one of the numbers one and two, and wherein the naphthalene nucleus may be substituted, for example, by hydroxyl, being in form of their alkali metal salts generally orange to red powders, which are soluble in water, dyeing animal fibres generally even orange to red shades of good fastness to washing.

Our new dyestuffs are obtainable by diazotizing in the usual manner an amine of the following general formula:

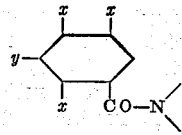

wherein the figures $x$, $y$, R and R' mean the same as stated above, and coupling in an acid medium with a 2-naphthylamine-mono- or -disulfonic acid or an N-alkyl- or -aryl- or a nuclear substitution product thereof.

The invention is illustrated by the following examples, without being limited thereto:

Example 1.—31.6 parts by weight of anthranilic acid-dibutylamide, obtainable for example by causing isatoic acid anhydride and dibutylamine to react upon each other and having a melting point of 44° C., are diazotized in the usual manner and coupled in weakly mineral acid solution with 34.1 parts by weight of 2-amino-8-naphthol-6-sulfonic acid. When the coupling is complete, the solution is rendered alkaline by the addition of soda, and the dyestuff having in the free state the following formula:

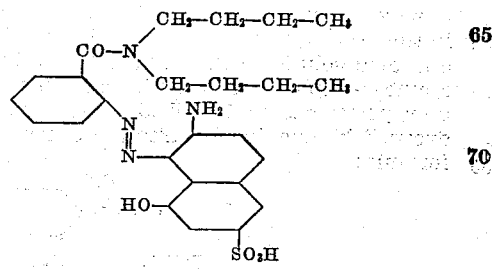

is salted out. After drying, it is obtained in form of a Bordeau red powder, which is soluble in water with a yellowish-red, in sulfuric acid with a carmine red coloration and dyes wool from an acid bath even red shades of good fastness to light and washing.

By substituting the 2-amino-8-naphthol-6-sulfonic acid by an equivalent quantity of 2-methylamino-8-naphthol-6-sulfonic acid, there is obtained a dyestuff of similar properties, yielding somewhat more bluish shades.

Example 2.—22.6 parts by weight of anthranilic acid-methylanilide are diazotized in the usual manner and coupled in weakly mineral acid solution with 25.7 parts by weight of 2-naphthylamine-7-sulfonic acid. The working up is performed as described in Example 1. The dyestuff having in the free state the following formula:

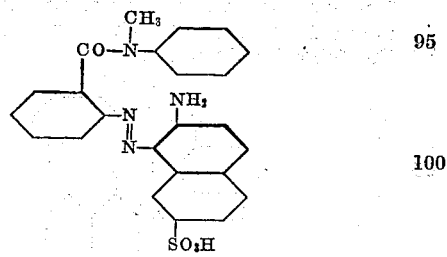

is obtained in form of a light red powder, which is soluble in water with a yellowish-red, and in sulfuric acid with a ruby-red coloration, dyeing wool orange shades.

By substituting the 2-naphthylamine-7-sulfonic acid by an equivalent quantity of 2-methylaminonaphthalene-7-sulfonic acid, there is obtained a dyestuff dyeing scarlet shades.

*Example 3.*—27.5 parts by weight of 4-chloro-3-methyl-2-amino-benzoic acid-methylanilide are diazotized in the usual manner and coupled in weakly mineral acid solution with 28 parts by weight of 2-amino-8-naphthol-6-sulfonic acid. The working up is performed as described in Example 1. The dyestuff having in the free state the following formula:

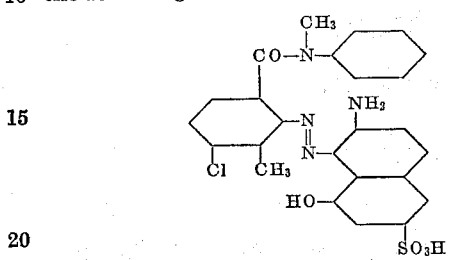

dyes wool red shades similar to those obtainable with the dyestuff of Example 1.

*Example 4.*—12 parts by weight of 5-acetylamino-2-amino-benzoic acid-ethylanilide, obtainable for example by causing the corresponding isatoic acid anhydride and ethylaniline to react upon each other at boiling temperature and having a melting point of 224° C., are diazotized in the usual manner and coupled in weakly mineral acid solution with 11 parts by weight of 2-amino-8-naphthol-6-sulfonic acid. The working up is performed as described in Example 1. The dyestuff having in the free state the following formula:

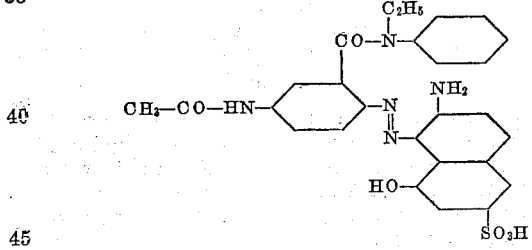

is, after drying, obtained as a Bordeau red powder, which is soluble in water with a yellowish-red, in sulfuric acid with a carmine red coloration, and dyes wool from an acid bath red shades of good fastness to washing and light.

*Example 5.*—12 parts by weight of 4-nitro-2-aminobenzoic acid-ethylanilide, obtainable by condensing 4-nitro-2-aminobenzoic acid and ethylaniline and having a melting point of 115° C., are diazotized in the usual manner and coupled in weakly mineral acid solution with 11 parts by weight of 2-amino-8-naphthol-6-sulfonic acid. The working up is performed as described in Example 1. The dyestuff having in the free state the following formula:

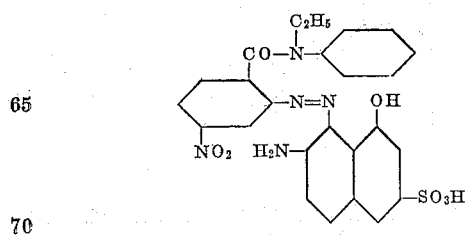

is, after drying, obtained as a Bordeau red powder, soluble in water with a bluish-red, in sulfuric acid with a yellowish-red coloration, and dyeing wool from an acid bath bluish-red shades of good fastness to washing and light.

By substituting the 4-nitro-2-aminobenzoic acid-ethylanilide by the isomeric 6-nitro compound, there is obtained a dyestuff having similar properties.

The dyestuff obtained in an analogous manner from: 3-methoxy-2-aminobenzoic acid-ethylanilide and 2-amino-8-naphthol-6-sulfonic acid dyes wool bluish-red shades; 4-6-dimethyl-2-aminobenzoic acid-dibutylamide and 2-amino-8-naphthol-6-sulfonic acid dyes wool red shades; anthranilic acid-dibenzylamide and 2-amino-8-naphthol-6-sulfonic acid dyes wool red shades; the dyestuff corresponds in the free state to the following formula:

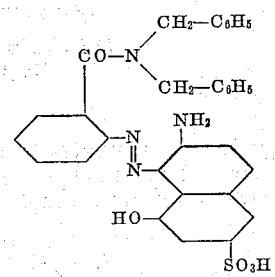

anthranilic acid-diphenylamide and 2-amino-8-naphthol-6-sulfonic acid dyes wool red shades; the dyestuff corresponds in the free state to the following formula:

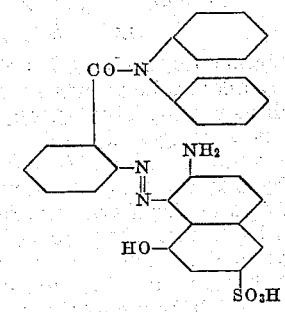

anthranilic acid-methyl-benzylamide and 2-amino-8-naphthol-6-sulfonic acid dyes wool red shades; anthranilic acid-butylanilide and 2-amino-8-naphthol-6-sulfonic acid dyes wool red shades; 4-chloro-2-aminobenzoic acid-methylanilide and 2-amino-8-naphthol-6-sulfonic acid dyes wool red shades; anthranilic acid-benzyl-hexahydroanilide and 2-amino-8-naphthol-6-sulfonic acid dyes wool red shades; anthranilic acid-benzylanilide and 2-amino-8-naphthol-6-sulfonic acid dyes wool red shades; anthranilic acid-piperidide, obtainable by boiling isatoic acid anhydride and piperidine, and 2-amino-8-naphthol-6-sulfonic acid dyes wool red shades; anthranilic acid-ethyl-2'-chloroanilide and 2-amino-8-naphthol-6-sulfonic acid dyes wool red shades; anthranilic acid-ethyl-3'-methylanilide and 2-amino-8-naphthol-6-sulfonic acid dyes wool red shades; anthranilic acid-ethyl-4'-methylanilide and 2-amino-8-naphthol-6-sulfonic acid dyes wool red shades; anthranilic acid-methylanilide and 2-naphthylamino-8-naphthol-3.6-disulfonic acid dyes wool red shades: 4-chloroanthranilic acid methylanilide and 2-phenylamino-8-naphthol-6-sulfonic acid dyes wool red shades; anthranilic acid-benzyl-hexahydroanilide and 2-dimethylamino-8-naphthol-6-sulfonic acid dyes wool red shades; anthranilic acid-diphenylamide and 2-methylphenylamino-8-naphthol-6-sulfonic acid dyes wool red shades.

We claim:

1. Azodyestuffs of the general formula:

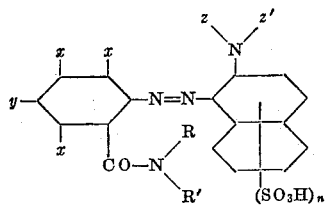

wherein $x$ stands for hydrogen which may be replaced by substituents selected from the group consisting of alkyl, alkoxy, acylamino, nitro and halogen, $y$ stands for hydrogen which may be replaced by substituents selected from the group consisting of alkyl, alkoxy, acylamino and halogen, R and R' stand for alkyl, aryl, hydro-aryl, aralkyl or jointly stand for a pentamethylene chain, $z$ and $z'$ stand for hydrogen, alkyl or aryl, $n$ stands for one of the numbers one and two, and wherein the naphthalene nucleus may be substituted by hydroxyl, being in form of their alkali metal salts generally orange to red powders, which are soluble in water, dyeing animal fibres generally even orange to red shades of good fastness to washing.

2. Azodyestuffs of the general formula:

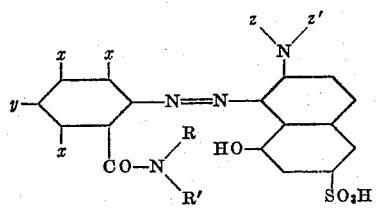

wherein $x$ stands for hydrogen which may be replaced by substituents selected from the group consisting of alkyl, alkoxy, acylamino, nitro and halogen, $y$ stands for hydrogen which may be replaced by substituents selected from the group consisting of alkyl, alkoxy, acylamino and halogen, R and R' stand for alkyl, aryl, hydroaryl, aralkyl or jointly stand for a pentamethylene chain, $z$ and $z'$ stand for hydrogen, alkyl or aryl, being in form of their alkali metal salts generally orange to red powders, which are soluble in water, dyeing animal fibres generally even orange to red shades of good fastness to washing.

3. Azodyestuffs of the general formula:

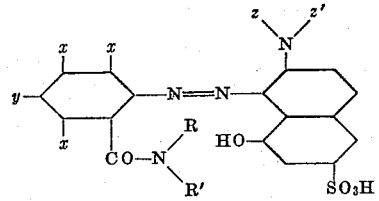

wherein $x$ stands for hydrogen which may be replaced by substituents selected from the group consisting of methyl, methoxy, acetylamino, chlorine or nitro, $y$ stands for hydrogen which may be substituted by substituents selected from the group consisting of methyl, methoxy, acetylamino or halogen, R and R' stand for substituents selected from the group consisting of alkyl from 1 to 4 carbon atoms, a radical of the benzene series, a radical of the benzyl series and a hexahydrobenzene radical, and $z$ and $z'$ stand for hydrogen, methyl or a phenyl radical, being in form of their alkali metal salts generally orange to red powders, which are soluble in water, dyeing animal fibres generally even orange to red shades of good fastness to washing.

4. The azodyestuff of the following formula:

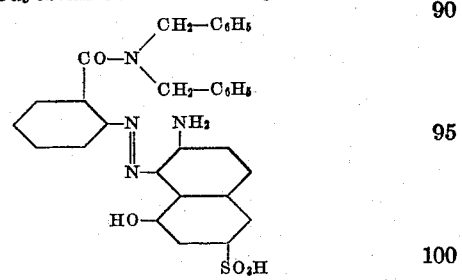

being in form of its alkali metal salts of a red powder, soluble in water, dyeing animal fibres red shades of good fastness to washing.

5. The azodyestuff of the following formula:

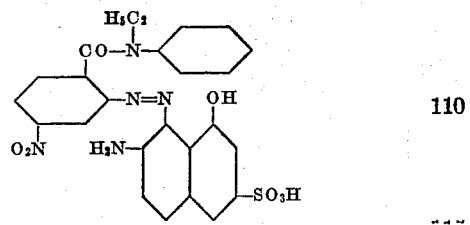

dyeing wool from an acid bath bluish-red shades of good fastness to washing and light.

6. The azodyestuff of the following formula:

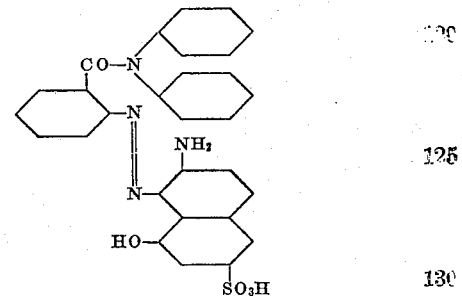

dyeing wool from an acid bath red shades of good fastness to washing and light.

WILHELM NEELMEIER.
ALFRED CARL.
HANS HERTLEIN.